United States Patent
Beul et al.

(10) Patent No.: US 8,776,520 B2
(45) Date of Patent: Jul. 15, 2014

(54) METHOD AND DEVICE FOR OPERATING A STEAM POWER STATION COMPRISING A STEAM TURBINE AND A PROCESS STEAM CONSUMER

(75) Inventors: Ulrich Beul, Essen (DE); Stefan Glos, Recklinghausen (DE); Matthias Heue, Bochum (DE); Thomas Hofbauer, Muelheim / Ruhr (DE); Ralf Hoffacker, Krefeld (DE); Nils Lückemeyer, Mülheim an der Ruhr (DE); Norbert Pieper, Duisburg (DE); Roland Sievert, Ratingen (DE)

(73) Assignee: Siemens Aktiengesellschaft, Munich (DE)

( * ) Notice: Subject to any disclaimer, the term of this patent is extended or adjusted under 35 U.S.C. 154(b) by 636 days.

(21) Appl. No.: 13/000,088

(22) PCT Filed: May 4, 2009

(86) PCT No.: PCT/EP2009/055332
§ 371 (c)(1),
(2), (4) Date: Dec. 20, 2010

(87) PCT Pub. No.: WO2009/153098
PCT Pub. Date: Dec. 23, 2009

(65) Prior Publication Data
US 2011/0100008 A1    May 5, 2011

(30) Foreign Application Priority Data

Jun. 20, 2008 (EP) .................... 08011260

(51) Int. Cl.
*F01K 13/00* (2006.01)
*F01K 17/00* (2006.01)

(52) U.S. Cl.
USPC ................. 60/645; 60/648; 60/677

(58) Field of Classification Search
USPC .................................... 60/648, 677
See application file for complete search history.

(56) References Cited

U.S. PATENT DOCUMENTS

| 4,042,809 A | 8/1977 | Shetler | |
|---|---|---|---|
| 4,164,848 A * | 8/1979 | Gilli et al. | 60/652 |
| 5,181,381 A | 1/1993 | Gounder | |

(Continued)

FOREIGN PATENT DOCUMENTS

| DE | 10227709 A1 * | 2/2003 |
| JP | H10121909 A | 5/1998 |
| WO | WO 2008023046 A1 * | 2/2008 |

OTHER PUBLICATIONS

Machine Translation of DE 10227709.*

*Primary Examiner* — Thomas Denion
*Assistant Examiner* — Jessica Kebea

(57) ABSTRACT

A method for operating a steam power station is provided. The steam turbine power station includes at least one steam turbine and a process steam consumer, wherein a steam mass flow is subdivided into a first partial mass flow and a second partial mass. In a first operating state, the first partial mass flow is supplied to the steam turbine and the second partial mass flow is supplied to the process steam consumer. In a second operating state, at least part of the second partial mass flow is supplied to the steam turbine at least after the first turbine stages. A steam power station is also provided.

17 Claims, 3 Drawing Sheets

(56) References Cited

U.S. PATENT DOCUMENTS 6,134,891 A * 10/2000 Zaviska et al. .................. 60/648
6,572,328 B2 * 6/2003 Tremmel et al. .................. 415/1
6,606,848 B1 * 8/2003 Rollins, III ................ 60/39.182
2006/0248890 A1 * 11/2006 Iijima et al. ..................... 60/645

* cited by examiner

METHOD AND DEVICE FOR OPERATING A STEAM POWER STATION COMPRISING A STEAM TURBINE AND A PROCESS STEAM CONSUMER

CROSS REFERENCE TO RELATED APPLICATIONS

This application is the US National Stage of International Application No. PCT/EP2009/055332, filed May 4, 2009 and claims the benefit thereof. The International Application claims the benefits of European Patent Office application No. 08011260.0 EP filed Jun. 20, 2008. All of the applications are incorporated by reference herein in their entirety.

FIELD OF INVENTION

The invention relates to a method for operation of a steam power station, and in particular to a method for operation of a steam power station with different operating modes. The invention also relates to a steam power station having a steam turbine and a process steam consumer, in which the method according to the invention can be carried out.

BACKGROUND OF INVENTION

Steam power stations (DKW) such as this, in particular steam power stations for generation of electrical power, generally comprise a steam turbine and a fired boiler or, in the form of a gas and steam turbine power installation (GuD), comprise a gas turbine with a downstream waste-heat steam generator and steam turbine.

In the case of fossil-fuelled power stations, the combustion of a fossil fuel leads to the creation of an off-gas containing carbon dioxide. This off-gas generally escapes into the atmosphere. The carbon dioxide which accumulates in the atmosphere impedes the emission of heat from our planet and in the process is leading to an increase in the surface temperature of the planet as a result of the so-called greenhouse effect. Carbon dioxide can be separated from the off-gas in order to achieve a reduction in the carbon-dioxide emission from fossil-fuelled power stations.

Various methods are generally known for separation of carbon dioxide from a gas mixture. One known method is to separate carbon dioxide from an off-gas after a combustion process (post-combustion $CO_2$ capture—Postcap). In this method, the carbon dioxide is separated using a washing agent in an absorption-desorption process.

In one traditional absorption-desorption process, the off-gas is in this case brought into contact with a selective solvent, as the washing agent, in an absorption column. In this case, carbon dioxide is absorbed by a chemical or physical process. The purified off-gas is bled out of the absorption column for further processing or extraction. The solvent loaded with carbon dioxide is passed to a desorption column in order to separate the carbon dioxide and to regenerate the solvent. The separation process in the desorption column can be carried out thermally. During this process, a gas-steam mixture comprising gaseous carbon dioxide and vaporized solvent is forced out of the loaded solvent. The vaporized solvent is then separated from the gaseous carbon dioxide. The carbon dioxide can now be compressed and cooled in a plurality of stages. The carbon dioxide can then be supplied to a storage facility or for reuse, in a liquid or frozen state. The regenerated solvent is once again passed to the absorber column, where it can once again absorb carbon dioxide from the off-gas that contains carbon dioxide.

Thermal power at a temperature level of about 120 to 150° C. is required in order to force the carbon dioxide out of the loaded solvent. This thermal power can be provided by steam which is taken from the steam turbine installation. After passing through the desorption column, the steam is condensed and is passed back again to the steam circuit.

A steam turbine installation generally comprises a high-pressure, a medium-pressure and a low-pressure part. Steam which is introduced into the high-pressure part is expanded in stages via the medium-pressure part and the subsequent low-pressure part. Intermediate superheating is generally carried out between the high-pressure part and the medium-pressure part. The distinction between the medium-pressure part and the low-pressure part is generally distinguished by a steam extraction capability on the overflow line between the medium-pressure part and the low-pressure part.

The extraction of steam from the overflow line for the purpose of $CO_2$ separation is comparable with the outputting of process steam, as is normal practice, for example, for remote heat supply. The amount of extracted steam is in this case dependent on the method of operation of the process steam consumer or the separation apparatus, and may in this case normally vary from 0% to 65%. The amount of steam extracted leads to a reduction in the steam mass flow which is supplied to the downstream turbine stage.

The steam pressure at the extraction point will now fall to the same extent, as a consequence of the steam extraction. The condensation temperature from the heat output also falls with the steam pressure. Since every heat consumer requires a defined temperature level, the steam pressure at the extraction point must not fall below the associated saturated steam pressure. By way of example, a process steam at a pressure level of at least 2.7 bar is required for remote-heat supply with an inlet temperature of 130° C.

In order to overcome this problem, it is known from the prior art for a throttle apparatus to be connected upstream of the low-pressure turbine. It is therefore possible to adjust the pressure in accordance with the temperature required by a corresponding heat consumer. However, this has the disadvantage that the throttling of the remaining steam leads, thermodynamically, to high losses.

Alternatively, the low-pressure turbine can also be adapted for operation with steam extraction upstream of the turbine inlet. For this purpose, modifications are made to the low-pressure turbine either from the start or retrospectively, by means of which the low-pressure turbine is matched to a lower steam mass flow, for the same inlet pressure. By way of example, retrospective modification can be carried out during retrospective installation of a carbon-dioxide separation apparatus in the power station. Known methods for matching the low-pressure turbine to the lower mass flows are to replace one or more rows of blades in order to reduce the choke capability. This method has the disadvantage that, if the process steam consumer or the carbon-dioxide separation apparatus fails or is shut down for desired purposes, at least a portion of the excess steam which occurs in this operating state must be dissipated into the condenser since, otherwise, the pressure and the temperature upstream of the low-pressure turbine would rise impermissibly. Alternatively, the low-pressure turbine and the waste-steam area of the medium-pressure turbine could be designed for higher pressures and temperatures from the start, although this can lead to considerable additional costs.

Steam power stations having process steam consumers as are known from the prior art have the general disadvantage either of losses due to inefficient throttling which is required for operation with a steam output or the loss of excess steam which is created in the operating mode without any steam output, and the steam must be passed to the condenser without being used. These losses lead to an undesirable deterioration in overall efficiency of the steam power station. The efficiency of a steam power station such as this with a process steam output is therefore considerably lower.

SUMMARY OF INVENTION

One object of the invention is to propose a method for operation of a steam power station having at least one steam turbine and one process steam consumer, in which efficient operation is ensured in all operating modes, with the available steam being reused, with better utilization of the available steam. A further object of the invention is to propose a steam power station having at least one steam turbine and one process steam consumer, which ensures efficient operation in all operating modes, with better utilization of the available steam.

According to the invention, the object directed at a method is achieved by a method for operation of a steam power station having at least one steam turbine and one process steam consumer, in which a steam mass flow is subdivided into a first mass flow element and a second mass flow element, with the first mass flow element being supplied to the steam turbine and the second mass flow element being supplied to the process steam consumer in a first operating mode, and with at least a portion of the second mass flow element being supplied to the steam turbine after at least the first turbine stage in a second operating mode.

The invention is in this case based on the idea that the steam power station is designed for operation with a process steam consumer and that the steam mass flow which can be introduced into the steam turbine is therefore matched to the first mass flow element. Matched means that the steam turbine runs at full load, and at the rated operating speed, by means of the first mass flow element.

Furthermore, the steam power station can be operated in a plurality of operating modes. In a first operating mode, the process steam consumer is in operation and is supplied with the second mass flow element. The first mass flow element is supplied to the steam turbine. If the process steam consumer is now shut down or operated on partial load in a second operating mode, the second mass flow element is created completely or partially as excess steam. At least a portion of the excess steam is now supplied to the steam turbine downstream from at least the first turbine stage. At least one turbine stage is bypassed for this purpose. The introduction of the second mass flow element downstream from the first turbine stage increases the steam mass flow which can be introduced into the steam turbine, as a result of which an increased steam mass flow can be passed through, with virtually the same steam pressure upstream of the steam turbine.

The shutdown or partial-load operation of the process steam consumer in the second operating mode can in this case occur as a result of failing, a deliberate shutdown, or by deliberate partial-load operation. Even when the process steam consumer has been shut down, it may be necessary for a portion of the second mass flow element to be required for a standby mode, and for only a portion of the second mass flow element to be created as excess steam. One particular advantage of the operating method is that it reacts very quickly to a sudden incidence of excess steam, and this can be made usable in the steam turbine.

The proposed operating method makes it possible to supply a steam turbine which is designed for a mass flow element and has a connected process steam consumer with an increased steam mass flow, thus avoiding a pressure rise in the steam upstream of the steam turbine, and as a result of which the steam turbine need not be designed for higher pressures. It is likewise possible to avoid throttling on full load or unused dissipation of the excess steam into the condenser.

The method for operation of a steam power station therefore allows considerably more efficient operation as a result of the overall efficiency of the power station being increased. This is achieved by the capability to reuse excess steam in the steam turbine, without any losses being incurred by throttling of the first mass flow element. The invention furthermore allows the retrospective installation of a process steam consumer, while satisfying economic conditions.

In one advantageous development of the operating method, at least a portion of the second mass flow element is passed into one or more bleed lines in the second operating mode. A portion of the second mass flow element is now used to feed the preheater which is connected to the bleed lines, and another portion flows into the steam turbine and is mixed with the main mass flow at the appropriate bleed point, and now participates in the further expansion.

Depending on the operating mode, it is likewise advantageous to supply all of the second mass flow element to the steam turbine downstream from at least the first turbine stage. This operating method is carried out in the second operating mode. The second mass flow element, which is in the form of excess steam, is in this case all supplied to the steam turbine. The second mass flow element is not subdivided, for example for a standby mode. All of the excess steam is therefore reused in the steam turbine.

In order to ensure that virtually all of the excess steam is accommodated in the steam turbine, it is advantageous to supply the second mass flow element to the steam turbine in a plurality of turbine stages. This is possible since the steam is also expanded in each turbine stage in the flow direction of the steam turbine, and the steam mass flow can therefore be introduced again. In the operating method, the second mass flow element is in this case subdivided into a plurality of flow elements, and each flow element is supplied as excess steam to the steam turbine in a different turbine stage. For example, as much excess steam as can be supplied to the second turbine stage is introduced into the second turbine stage. The excess steam which it has not been possible to introduce into the second turbine stage is then supplied to the third turbine stage. If the amount of excess steam which can be introduced is also reached in the third turbine stage, the excess steam which is still present is supplied to the fourth turbine stage, etc. The largely complete accommodation of the excess steam in the steam turbine results in a performance increase of the steam turbine, and leads to an increase in efficiency.

In one particular refinement of the operating method, a further steam turbine is connected upstream of the steam turbine, with the further steam turbine being operated at a first pressure stage and with the steam turbine being operated at a second pressure stage, and with the first pressure stage being set to be higher than the second pressure stage. The steam turbine with the second pressure stage is operated as a low-pressure turbine, and is connected downstream from a medium-pressure turbine. The steam for the process steam consumer is extracted between the medium-pressure turbine and the low-pressure turbine. The extraction point is in this case governed by the necessary steam parameters which the process steam consumer requires. An arrangement is accordingly also feasible in which the steam is extracted at a different point. In a high-pressure, medium-pressure and low-pressure turbine arrangement, for example, the steam can also be extracted between the high-pressure turbine and the medium-pressure turbine.

The second mass flow element is advantageously supplied to the steam turbine in a turbine stage at which a desired ratio is taken into account between the adjustable steam mass flow and the performance increase of the steam turbine. The steam is expanded in each turbine stage in the flow direction of the steam turbine, and more steam mass flow can be passed through. However, the power which can be achieved by the steam mass flow that is introduced also decreases with every further turbine stage. For example, a steam mass flow which is to be introduced into the steam turbine and corresponds approximately to 100% of the steam mass flow upstream of the first turbine stage can be largely led into the third turbine stage.

In one advantageous development of the operating method, the ratio of the subdivision of the steam mass flow into the first mass flow element and the second mass flow element is regulated as a function of the operating mode. Corresponding measurement and control systems are provided for the control process. A control process that is matched to the operating mode makes it possible to react quickly to changes in the method of operation of the process steam consumer. For example, if the process steam consumer fails, the second mass flow element which is in the form of excess steam in the second operating mode can thus be made usable in the steam turbine without major losses.

It is also advantageous that the operating method keeps the first mass flow element substantially constant in both operating modes. The steam pressure upstream of the first turbine stage of the steam turbine can thus be kept approximately at the same level, thus allowing the steam turbine to be matched to the first mass flow element, and making it possible to avoid the need for throttling.

The proposed operating method is particularly advantageous when the process steam consumer is a carbon-dioxide separation apparatus. The second mass flow element is used to assist a desorption process in the first operating mode. Already existing power stations can in this case be retrofitted for full load without the use of a throttling apparatus.

The object of the invention that is directed at a steam power station is achieved by a steam power station having a steam turbine and a process steam consumer, with the steam turbine having a first pressure stage and a second pressure stage, with a steam line which is connected to the first pressure stage splitting into a process steam line and an overflow line, and with the process steam line being connected to the process steam consumer and the overflow line being connected to the second pressure stage, wherein a bypass line is provided which connects the overflow line to the second pressure stage downstream from at least the first turbine stage, such that steam can bypass at least the first turbine stage of the second pressure stage.

The invention is in this case based on the idea that the steam power station is designed for operation with a process steam consumer, and that the choke capability of the steam turbine is therefore matched to a reduced steam mass flow. Furthermore, a bypass line is provided, and connects the overflow line to the second pressure stage of the steam turbine after at least the first turbine stage. Steam can therefore bypass at least the first turbine stage of the second pressure stage during operation of the steam power station. The overflow line makes it possible to set the steam pressure upstream of the first turbine stage to be approximately constant thus allowing the second pressure stage to be matched to a reduced steam mass flow, avoiding the need to use a throttling apparatus when on full load. The introduction of excess steam through the bypass line into the second pressure stage downstream from at least the first turbine stage furthermore increases the performance of the steam turbine and makes the introduction of the excess steam into a condenser superfluous.

The proposed steam power station is considerably more efficient in operation, because of its higher efficiency. The efficiency increase is achieved by the reuse of the excess steam in the steam turbine. Since there is no need to use a throttle valve on full load, no losses result from throttling of the steam mass flow. The invention furthermore allows the retrospective installation of a process steam consumer while satisfying economic conditions.

In one advantageous development of the steam power station, a plurality of bypass lines are provided and connect the overflow line to the second pressure stage downstream from at least the first turbine stage with different turbine stages, such that steam can bypass at least the first turbine stage and can be introduced at a plurality of turbine stages. For this purpose, the bypass line is split into a plurality of line elements, each of which are connected to different turbine stages of the steam turbine.

In one advantageous refinement of the steam power station, the second pressure stage is designed for a lower pressure than the first pressure stage. The second pressure stage is a steam turbine for low pressure. The first pressure stage is accordingly a steam turbine for medium pressure, which is connected downstream from a high-pressure steam turbine. The arrangement for tapping off the bypass line is governed by the necessary steam parameters which the process steam consumer requires. For example, if the process steam consumer is a separation apparatus for carbon dioxide, the steam parameters between the medium-pressure turbine and the low-pressure turbine are suitable for steam extraction. The bypass line is therefore tapped off from the overflow line between the medium-pressure turbine and the low-pressure turbine.

An arrangement is also feasible in which the steam is extracted at a different point. For example, in the case of a high-pressure, medium-pressure and low-pressure turbine arrangement, the steam can also be extracted between the high-pressure turbine and the medium-pressure turbine, such that the first pressure stage is the high-pressure turbine and the second pressure stage is the medium-pressure turbine.

It is also advantageous to connect a control valve in the process steam line, such that the amount of a steam mass flow which is supplied to the process steam consumer can be controlled as a function of the operating state of the process steam consumer. Process steam which is not supplied to the process steam consumer is in this case created as excess steam. It is likewise advantageous to connect a control valve in the bypass line such that excess steam can be introduced into the second pressure stage downstream from at least the first turbine stage in a controlled manner, as a function of the operating state of the process steam consumer, such that the steam mass flow which is supplied to the first turbine stage of the steam turbine can be set to be largely constant.

In one advantageous further development of the steam power station, the overflow line is connected to one or more bleed lines. The feed water preheater is therefore operated using a portion of the excess steam, while another portion flows into the turbine, and participates in the further expansion. A control valve is provided in order to control the steam mass flow to the bleed line.

In one particular refinement of the steam power station, the process steam consumer is a separation apparatus for carbon dioxide. In this case, the process steam line connects the steam line to a heat exchanger which is intended for heating of a desorption column.

Further advantages of the steam power station result in an analogous manner from the corresponding developments of the operating method, as described above, for operation of a steam power station.

BRIEF DESCRIPTION OF THE DRAWINGS

The invention will be explained in the following text with reference to exemplary embodiments. In the figures.

DETAILED DESCRIPTION OF INVENTION

Figure 1:
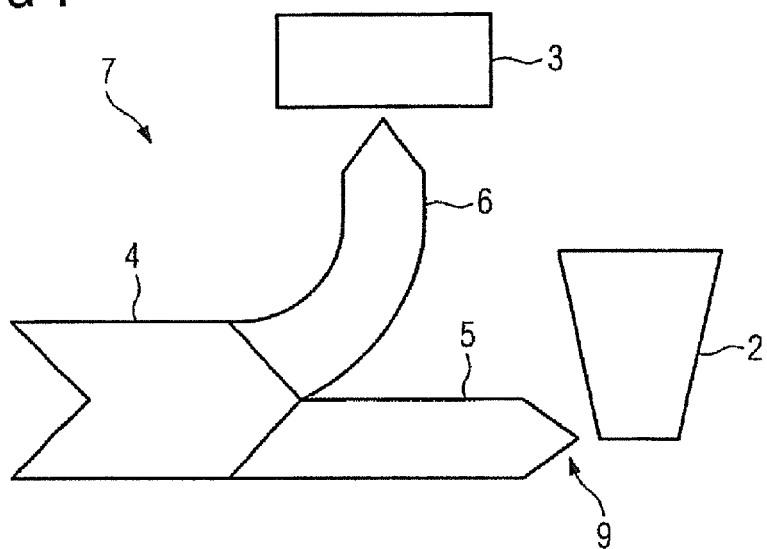
FIG. 1 shows one exemplary embodiment of an operating method for operation of a steam power station having a process steam consumer, in a first operating mode.

FIG. 1 shows one exemplary embodiment of an operating method for operation of a steam power station having a process steam consumer, in a first operating mode 7. The figure shows an outline sketch, illustrating a steam mass flow 4, a process steam consumer 3 and a steam turbine 2. The steam mass flow 4 is subdivided into a first mass flow element 5 and a second mass flow element 6. The first mass flow element 5 is supplied to the process steam consumer 3. The second mass flow element 6 is supplied to the steam turbine 2 in the first turbine stage 9. The steam turbine 2 is in this case designed for the second mass flow element 6.

Figure 2:
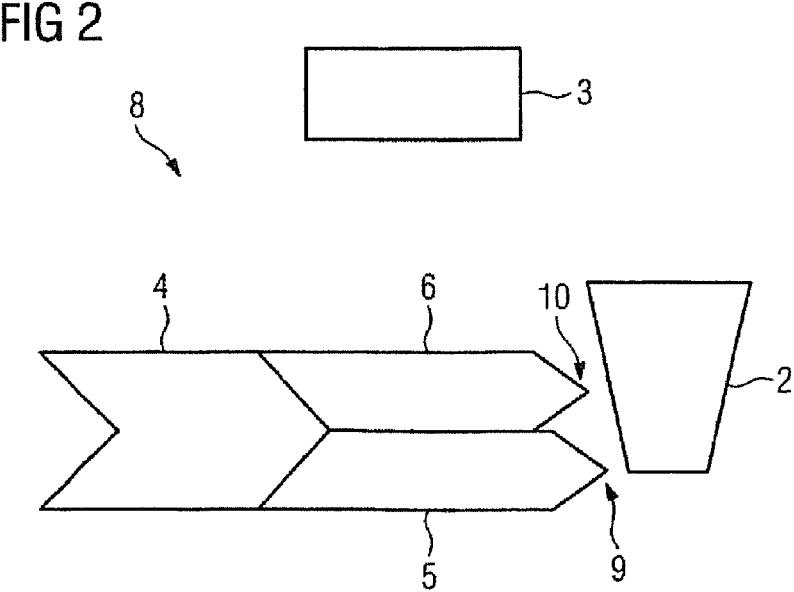
FIG. 2 shows one exemplary embodiment of an operating method for operation of a steam power station having a process steam consumer, in a second operating mode.

FIG. 2 shows the operating method for operation of a steam power station having a process steam consumer, in a second operating mode 8. Analogously to FIG. 1, the figure shows a steam mass flow 4, a process steam consumer 3 and a steam turbine 2. The steam mass flow 4 is subdivided into a first mass flow element 5 and a second mass flow element 6. The second mass flow element 6 is supplied to the steam turbine 2 in the first turbine stage 9. The first mass flow element 5 is supplied to the steam turbine 2, in a turbine stage 10 which follows the first turbine stage, in the second operating mode 8. The first mass flow element 5 can therefore largely be made usable in the steam turbine 2.

Figure 3:
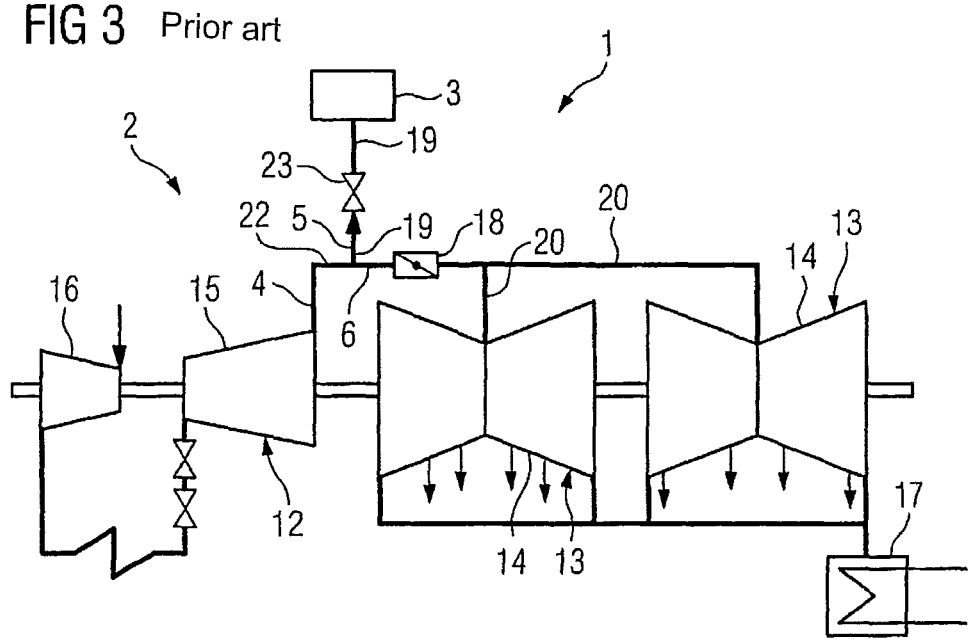
FIG. 3 shows a conventional steam power station having a process steam consumer and throttling apparatus.

FIG. 3 shows a conventional steam power station having a process steam consumer as is known from the prior art. The figure shows a steam turbine 2 which comprises a high-pressure turbine 16, a medium-pressure turbine 15 and two low-pressure turbines 14, as well as a process steam consumer 3 and a condenser 17. A steam line 22 is connected to an outlet of the medium-pressure turbine 15 and is split at a splitting point into a process steam line 19 and an overflow line 20. The process steam line 19 is connected to a supply line to the process steam consumer 3. A control valve 23 is connected in the process steam line 19. The overflow line is connected to the inlets of the low-pressure turbines 14. A throttle valve 18 is connected in the overflow line. A condenser 17 is connected downstream from the low-pressure turbines 14.

During operation of the conventional steam power station with a process steam consumer, a steam mass flow 4 is split into a first mass flow element 5 and a second mass flow element 6, with the control valve 23 open. In order to allow the low-pressure turbines 14 to be operated efficiently, the steam turbines 14 must be throttled by the throttle valve 18. When the control valve 23 is closed, the steam mass flow 4 is supplied to the low-pressure turbines 14. For this purpose, the throttle valve 18 is opened such that the steam mass flow 4 can be supplied largely unthrottled to the low-pressure turbines. The throttling is necessary since the low-pressure turbines 14 must be designed for the entire steam mass flow 4.

Figure 4:
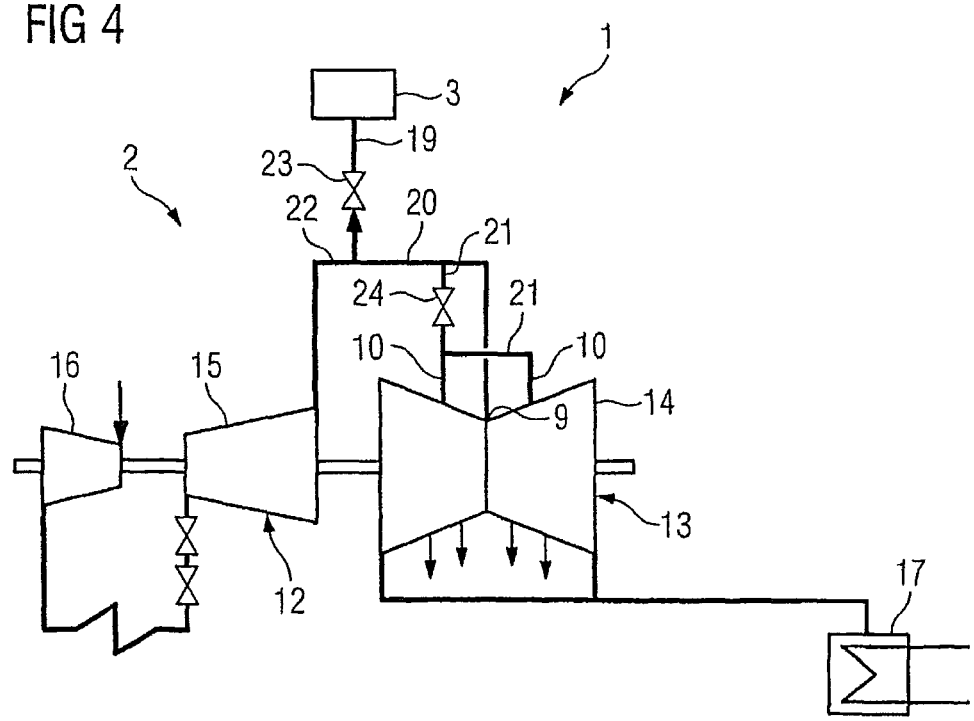
FIG. 4 shows one exemplary embodiment of a steam power station having a process steam consumer and a bypass line.

FIG. 4 shows one exemplary embodiment of a steam power station 1 according to the invention having a process steam consumer and a bypass line 21. The figure shows a steam turbine 2, which comprises a high-pressure turbine 16, a medium-pressure turbine 15 and a low-pressure turbine 14, as well as a process steam consumer 3 and a condenser 17. An exemplary embodiment with two low-pressure turbines 14 is not illustrated. The medium-pressure turbine 15 is designed for a first pressure stage 12, and the low-pressure turbine 14 is designed for a second pressure stage 13. A steam line 22 is connected to an outlet of the medium-pressure turbine 15 and splits at a splitting point into a process steam line 19 and an overflow line 20. The process steam line 19 is connected to a supply line for the process steam consumer 3. A control valve 23 is connected in the process steam line 19. The overflow line 20 is connected to the inlet of the low-pressure turbine 14 in the first turbine stage 9. A bypass line 21 is tapped off from the overflow line 20 and is connected to the low-pressure turbine 14 in a turbine stage 10 which follows the first turbine stage. A control valve 24 is connected in the bypass line 21. A condenser 17 is connected downstream from the low-pressure turbine.

During operation of the steam power station 1 according to the invention, a steam mass flow 4 is subdivided into a first mass flow element 5 and a second mass flow element 6 with the control valve 23 open. The first mass flow element 5 is supplied as process steam via the process steam line 19 to a process steam consumer 3. The second mass flow element 6 is supplied via the overflow line 20 to the steam turbine of both first turbine stages. The steam mass flow which can be introduced into the first turbine stage 9 is matched to the second mass flow element 6. When the control valve 23 is throttled or closed, a reduced or no second mass flow element 6 is supplied to the process steam consumer 3. The steam mass flow which cannot be fed to the process steam consumer 3 is now in the form of excess steam, which would increase the pressure of the steam mass flow upstream of the low-pressure turbine 14. Since the low-pressure turbine 14 is designed for operation without excess steam, this excess steam would have to be dissipated into the condenser 17. In order to keep the pressure of the steam mass flow virtually constant, the control valve 24 is opened, as a result of which a portion of the steam mass flow of the low-pressure turbine 14 can be supplied to a turbine stage 10 which follows the first turbine stage.

Figure 5:
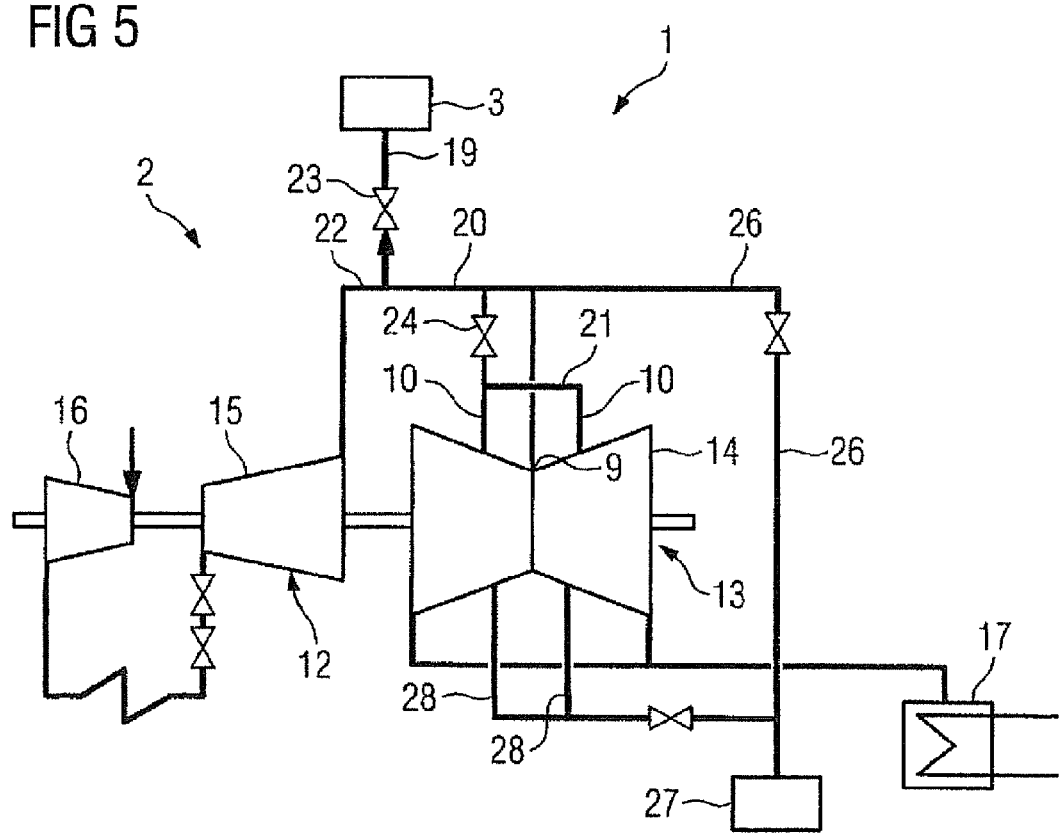
FIG. 5 shows one exemplary embodiment of a steam power station having a bleed line.

FIG. 5 shows one exemplary embodiment of a steam power station 1. The steam power station 1 is designed virtually analogously to that in FIG. 4. However, two low-pressure turbines 14, that is to say two second pressure stages 13, are additionally provided. Two bypass lines 21 are therefore also provided. In addition, the overflow line 20 is also connected to the bleed lines 28. During operation of the steam power station 1, a feed water preheater 27 which is connected to the bleed line 21 can thus be operated with a portion of the excess steam, while another portion of the excess steam flows into the low-pressure turbine 14, and participates in the further expansion.

The invention allows operation of a steam power station having at least one steam turbine and one process steam consumer with high efficiency in all operating modes. Furthermore, the circuitry improvement makes it possible to achieve a considerable improvement in efficiency in comparison to a conventional steam power station with a process steam consumer. The efficiency increase is achieved by reuse of the excess steam in the steam turbine, in a turbine stage which follows the first turbine stage. Since there is no need for any throttle valve, no losses occur as a result of throttling of the steam mass flow.

The invention claimed is:

1. A method for operation of a steam power station, comprising:
   providing a steam turbine and a process steam consumer;
   subdividing a steam mass flow into a first mass flow element and a second mass flow element;
   supplying the first mass flow element to the steam turbine in a first operating mode and in a second operating mode;
   supplying the second mass flow element to the process steam consumer in the first operating mode; and
   supplying a first portion of the second mass flow element to the steam turbine to a second turbine stage which follows after a first turbine stage in a second operating mode,
   wherein the first operating mode is defined by the process steam consumer in full operation,
   wherein the second operating mode is defined by the process steam consumer either shut down or operating on a partial load, and
   wherein a determination of a subdivision of the steam mass flow into the first mass flow element and the second mass flow element is regulated as a function of the operating mode.

2. The method as claimed in claim 1, wherein the first portion of the second mass flow element is supplied to the steam turbine and a second portion is supplied to a bleed point on the steam turbine in the second operating mode.

3. The method as claimed in claim 1, wherein the entire second mass flow element is supplied to the steam turbine after the first turbine stage in the second operating mode.

4. The method as claimed in claim 1,
   wherein an upstream steam turbine is connected upstream of the steam turbine,
   wherein the upstream steam turbine is operated at a first pressure stage,
   wherein the steam turbine is operated at a second pressure stage, and
   wherein the first pressure stage is set to be higher than the second pressure stage.

5. The method as claimed in claim 4, wherein the steam turbine operated at the second pressure stage is operated as a low-pressure turbine.

6. The method as claimed in claim 3, wherein the second mass flow element is supplied to the steam turbine in a second turbine stage, taking into account a desired first ratio of an adjustable steam mass flow to a performance increase of the steam turbine.

7. The method as claimed in claim 1, wherein the first mass flow element is kept constant in both operating modes.

8. The method as claimed in claim 1, wherein the second mass flow element is used in the first operating mode in order to assist an absorption process of carbon dioxide from a flue gas.

9. A steam power station, comprising:
   a steam turbine including a first pressure stage and a second pressure stage;
   a process steam consumer; and
   a steam line connected to the first pressure stage splitting into a process steam line and an overflow line,
   wherein the process steam line is connected to the process steam consumer and the overflow line is connected to the second pressure stage, and
   wherein a bypass line is provided which connects the overflow line to the second pressure stage downstream from a first turbine stage of a plurality of turbine stages, such that steam may bypass the first turbine stage of the second pressure stage,
   wherein a first control valve is connected in the process steam line such that an amount of a steam mass flow supplied to the process steam consumer is regulated as a function of the operating state of the process steam consumer, and
   wherein the steam mass flow which is not supplied is in the form of excess steam.

10. The steam power station as claimed in claim 9, wherein a plurality of bypass lines are provided and connect the overflow line to the second pressure stage downstream from the first turbine stage with different turbine stages, such that steam may bypass the first turbine stage and is introduced at one of the plurality of turbine stages.

11. The steam power station as claimed in claim 10, wherein the second pressure stage is designed for a lower pressure than the first pressure stage.

12. The steam power station as claimed in claim 9, wherein the second pressure stage is designed for a lower pressure than the first pressure stage.

13. The steam power station as claimed in claim 9, wherein the second pressure stage is a steam turbine for low pressure.

14. The steam power station as claimed in claim 9, wherein a first control valve is connected in the process steam line such that an amount of a steam mass flow supplied is regulated as a function of the operating state of the process steam consumer, and
   wherein the steam mass flow which is not supplied is in the form of excess steam.

15. The steam power station as claimed in claim 9, wherein a second control valve is connected in the bypass line such that excess steam is introduced into the second pressure stage downstream from the first turbine stage in a controlled manner as a function of the operating state of the process steam consumer, such that the steam mass flow which is supplied to the first turbine stage of the steam turbine may be set to be constant.

16. The steam power station as claimed in claim 9, wherein the overflow line is connected to a bleed line such that a feed water preheater, which is connected to the bleed line, is supplied with steam from the overflow line during operation of the steam power station.

17. The steam power station as claimed in claim 9, wherein the process steam consumer is a separation apparatus for carbon dioxide.

* * * * *